United States Patent

Stock et al.

[11] 3,937,186
[45] Feb. 10, 1976

[54] ROTARY COMBUSTION ENGINE WITH IMPROVED FUEL CONTROL

[75] Inventors: Dieter Stock, Frankenbach; Johannes Steinwart, Bad Friedrichshall, both of Germany

[73] Assignees: Audi NSU Auto Union Aktiengesellschaft, Neckarsulm; Wankel G.m.b.H., Lindau, both of Germany

[22] Filed: May 23, 1974

[21] Appl. No.: 473,091

[30] Foreign Application Priority Data
July 5, 1973 Germany............................ 2334183

[52] U.S. Cl. ............... 123/8.45; 123/8.09; 123/108
[51] Int. Cl.² .......................................... F02B 53/06
[58] Field of Search ........ 123/8.45, 8.01, 8.13, 108; 418/61 A

[56] References Cited
UNITED STATES PATENTS

| | | |
|---|---|---|
| 3,168,077 | 2/1965 | Froede................ 123/8.13 |
| 3,557,762 | 1/1971 | Mitchell............... 123/108 |
| 3,780,706 | 12/1973 | Panhard.............. 123/8.01 |
| 3,800,760 | 4/1974 | Knee.................. 418/61 A |

FOREIGN PATENTS OR APPLICATIONS

| | | | |
|---|---|---|---|
| 1,300,123 | 7/1969 | Germany............. | 123/8.45 |

Primary Examiner—C. J. Husar
Assistant Examiner—O. T. Sessions
Attorney, Agent, or Firm—Raymond P. Wallace; Victor D. Behn

[57] ABSTRACT

A trochoidal type rotary internal combustion engine wherein the intake port is controlled by the rotor, and variation in the fuel feed is provided by a slidable valve member in the intake pipe, which in closed position seats very close to the peripheral surface of the engine cavity to prevent entry of exhaust gas into the intake line at idling or low load conditions, the valve being controlled by a foot pedal or other conventional adjusting means.

5 Claims, 4 Drawing Figures

ROTARY COMBUSTION ENGINE WITH IMPROVED FUEL CONTROL

BACKGROUND

This invention relates to rotary internal combustion engines of the trochoidal type, and more particularly to a means of preventing entry of exhaust gases into the intake channel during idling or operating at low load.

In such engines the intake channel has an orifice controlled by the rotor, at the inner surface of the engine housing. There is in such engines a certain amount of overlap between intake and exhaust ports after the opening of the intake port to a given chamber and before the exhaust port closes to that chamber, and during idling or operation at low load the underpressure caused by the enlargement of the intaking chamber may cause the intake channel to become filled with exhaust gas. Even though the throttle flap may be positioned as closely as possible to the orifice of the intake channel, for constructional reasons the axle of the flap must be positioned at least far enough back from the opening that at the fully opened condition the edge of the flap will not protrude into the operating chamber. The filling of a portion of the intake channel with exhaust gas has the result, particularly when idling or operating at low load, that the fresh gas entering into the intaking operating chamber encounters a sizable body of exhaust which may impair the formation of an ignitible mixture.

It has also been found that with trochoidal rotary engines of the prior art it is more difficult to produce a good fuel-air mixture in the intake channel than with reciprocating piston engines. In reciprocating engines the hot intake valve makes a substantial contribution to preparing the mixture by vaporizing such droplets of fuel as may be still liquid. In the rotary engine the intake zone is never exposed to combustion, and hence has no such hot members to aid in vaporization.

There is known a carburetor in which, in the channel leading to the intake manifold, instead of a throttle flap there is disposed a slide member movable longitudinally of the mixture flow, having a portion with a conical surface cooperating with a mating conical countersurface and forming an annular throttling gap therewith. When the gap is small, depending on the load condition, the fresh gas flows through at high speed and tiny droplets of liquid fuel are thoroughly atomized. With such a design, however, because of its arrangement, there necessarily exists a relatively large volume in the intake pipe between this throttling device and the intake port, which causes the same difficulty as described above, at idling or partial load. Further, the device is limited to carburetors and cannot be used for supplying fuel by injection.

Other expedients have been tried to prevent entry of exhaust gas into the intake channel, such as rotary valves or flap valves therein. The rotary valve must be positioned even further back from the orifice than an ordinary throttle flap, since there must be enough metal to constitute the barrel for rotation of the valve therein. Flap valves of the reed type are not sufficiently reliable; they may be too stiff to close fully, or they may impede inflow of fresh gas.

The throttle valving arrangement of this invention overcomes these limitations of the prior art.

SUMMARY

This invention provides a rotary internal combustion engine of trochoidal type, in which the intake channel has disposed therein a valve member seating in its fully closed position substantailly at the inner trochoidal surface of the peripheral housing, the valve member being displaceable between open and closed positions along an axis normal to the inner surface of the housing, whereby when the valve is closed or nearly closed there is substantially no cavity in the region of the intake orifice for entry of exhaust gas.

When in the nearly closed position the valve member and its seat form an alterable throttling gap which is considerably narrower than that of the ordinary throttle flap, and considerably longer at its circumference, for the same flow through. This has the advantage that the fuel-air mixture passing through the gap can be greatly accelerated, at which high speed there is produced a very turbulent flow condition directly at the intake port, resulting in complete atomization of any liquid fuel droplets which may still be present.

There is thus obtained a thorough mixing and good preparation of the inducted mixture, leading to better burning and a reduction of the detrimental constituents of the exhaust gas. The slide valve can be opened far enough that under full load no obstruction to the mixture flow occurs, as would be caused by the shaft of an ordinary throttle valve, and thus noticeably better performance can be obtained. The valve opening is governed by the operator by means of an accelerator device of conventional type, directly or indirectly linked.

It is therefore an object of this invention to provide a rotary internal combustion engine having improved fuel supply means.

Another object is to provide such an engine having an intake system into which exhaust gas cannot enter.

A further object is to provide such an engine having an intake system conducive to good vaporization of incoming charge.

Other objects and advantages will become apparent on reading the following specification in connection with the accompanying drawings.

BRIEF DESCRIPTION OF THE DRAWINGS

As shown in FIG. 1, a rotary combustion engine 11 of the trochoidal type has a housing comprising a peripheral shell 12 having a multilobed substantially trochoidal inner peripheral surface 13, and side walls 14, the housing defining an inner engine cavity 16 in which is rotatably mounted a generally polygonal rotor 17 having a plurality of apex portions 18 which continuously sweep the inner peripheral surface 13 in sealing relation as the rotor turns in the direction shown by the arrow, thereby defining operating chambers of varying volume.

Figure 1:
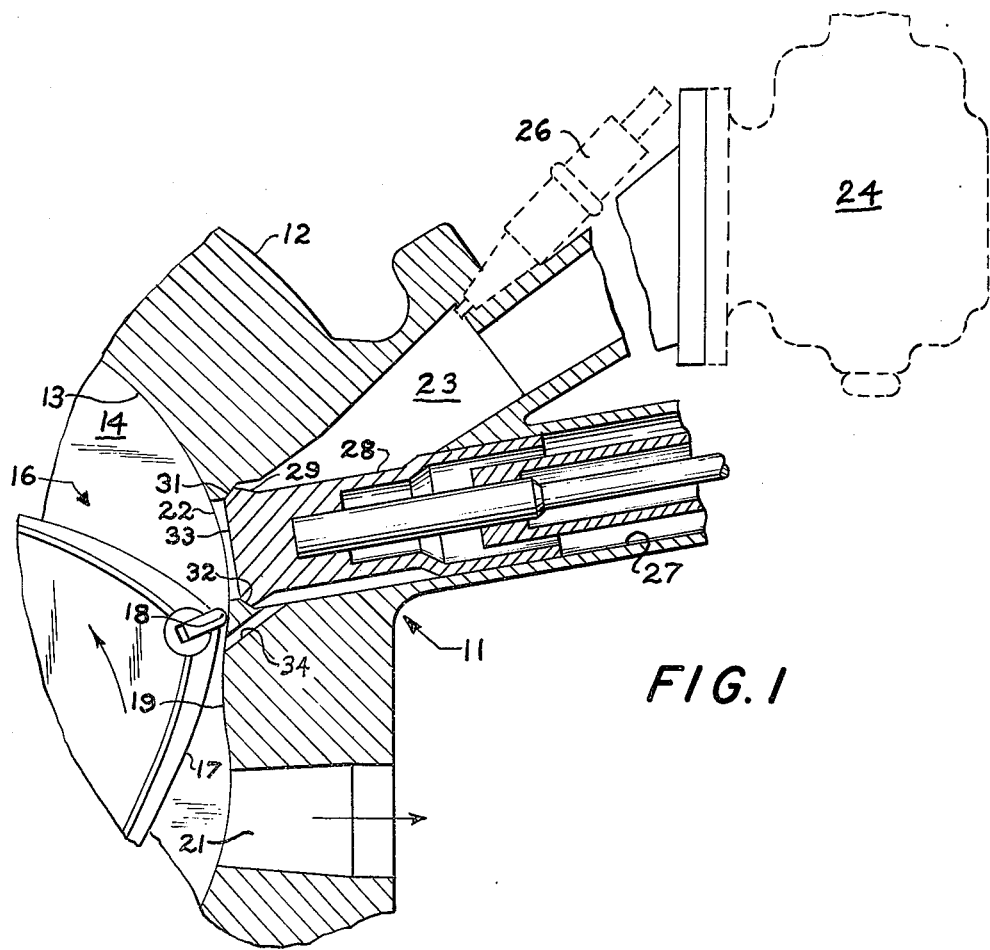
FIG. 1 is a fragmentary cross-section through a portion of a trochoidal rotary internal combustion engine, showing one embodiment of the throttling device.

In the region of a cusp portion 19 of the trochoidal surface 13 there is provided an exhaust port 21 through the peripheral shell 12 somewhat upstream from the cusp, and somewhat downstream therefrom there is provided an intake port 22, these ports being swept successively and controlled by the apexes 18 of the rotor. An intake channel 23 supplies fuel-air mixture to the intake port orifice 22, either from a carburetor 24 or a fuel injector 26. A guideway 27 communicates with the induction channel 23 at an acute angle thereto, the guideway having disposed therein a generally cylindrical sliding member 28 which is axially displaceable along the guideway and extends into intake channel 23. The longitudinal axis of the guideway and consequently of the slide 28 is disposed substantially normal to the curvature of the inner trochoidal surface 13 at the center of the intake port 22.

The slide 28 has an inner end 29 comprising a closure head provided with a frustoconical sealing surface 31 entering at least partially into the intake port and cooperating with a mating annular seat 32 surrounding the intake port 22 adjacent to the inner trochoidal surface 13 of the peripheral shell. The slide 28 has the same general function as the commonly used throttle flap in a combustion engine, that of varying and controlling the amount of fresh mixture admitted to the combustion chamber. The sealing surface 31 of the closure head and its mating seat 32 form a variable gap for varying and controlling the flow of fuel-air mixture.

The end face 33 of the closure head 29 when in the fully closed position is disposed as closely as possible to the surface curvature of inner surface 13, preferably such that the center of the plane end face 33 is approximately tangent to the curvature of the inner surface, but spaced therefrom a sufficient amount allowing for manufacturing tolerances so that no portion of the closure head may enter the operating chamber. This spacing may be as little as a few thousandths of an inch, and its showing has been exaggerated in the drawings for clarity of illustration. There thus remains only an extremely small volume of orifice 22 in which exhaust gas may collect when it is carried over while the exhaust port is still in communication with the intaking chamber. Such a minute amount of exhaust has no disturbing effect on the incoming fresh mixture when the engine is idling or operating at part load.

The slide member 28 is operated by an accelerator pedal or the like, retracting from its closed position as the pedal is depressed, and opening between its sealing surface 31 and the seat 32 an annular throttling gap through which fuel-air mixture passes from the intake channel 23. The mixture is accelerated through this gap and passes through the intake port 22 in a highly turbulent flow into the combustion chamber, whereby any remaining liquid portions still present in the mixture are thoroughly atomized.

When the engine is idling the slide member is fully closed against its seat, and there may be provided a small by-pass channel 34 through which a sufficient supply of mixture can be drawn for idling operation.

Figure 2:
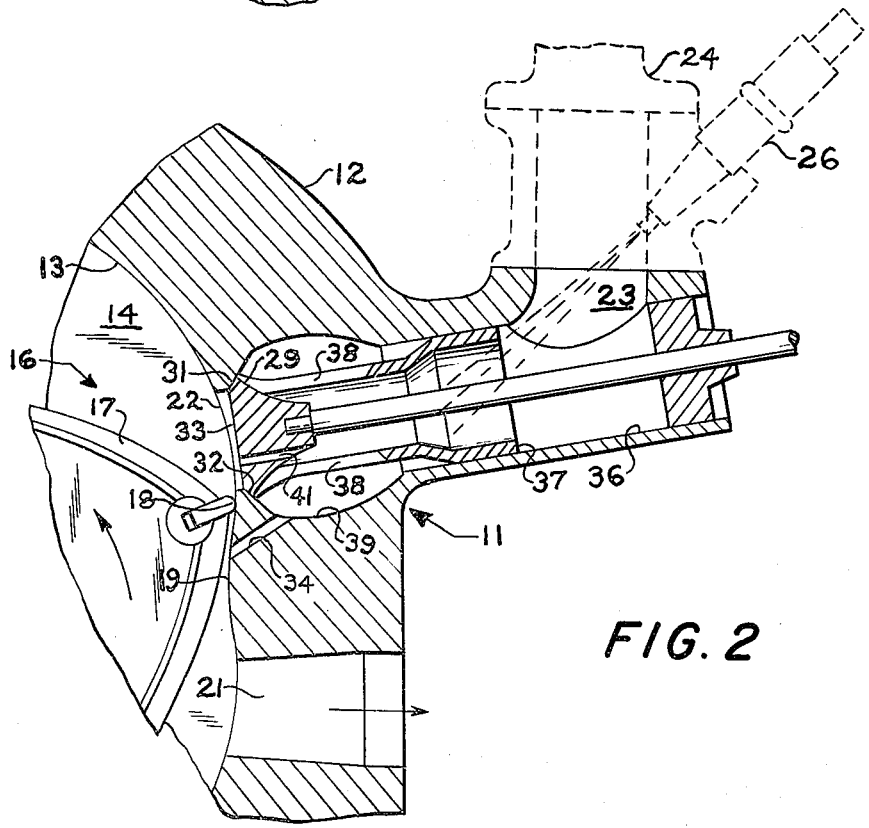
FIG. 2 is a similar cross-section showing another embodiment of the throttling device.

In the showing of the embodiment of FIG. 2 the same reference numerals as in FIG. 1 are used for the same or closely similar features. The intake channel 23 communicates with a guideway 36 at a greater distance from the intake port 22 than in the previous embodiment. A generally cylindrical slide member 37 is disposed in the guideway, the slide being hollow and having its outermost end open to the intake channel 23. Its inwardly disposed end 29 is a closure head of similar form to the previous embodiment, having a frustoconical sealing surface 31 seating against a mating surface 32 surrounding the intake port 22. As in the embodiment of FIG. 1, fuel-air mixture is supplied from a carburetor 24, or fuel is injected by a nozzle 26 into the intake channel 23 where it mixes with air. In the present case, however, the mixture enters the hollow interior of slide member 37 through its outward end open to the intake channel. The barrel of slide member 37 has lateral apertures 38 therethrough just above its closure head 29, communicating with an annular cavity 39 formed in the peripheral housing 12, which cavity surrounds the inward end of slide 37. The incoming mixture thus passes through the barrel of the slide, and out the apertures 38 and into cavity 39, from which it passes through the annular gap between surfaces 31 and 32, as in the previous embodiment. For idling a sufficient quantity of fuel-air mixture can be supplied as before through a by-pass channel 34 extending between cavity 39 and the inner trochoidal surface 13, or through a by-pass channel 41 extending from the interior of the slide 37 through its closure head 29 and having its orifice at the end face 33 of the closure head.

Figure 3:
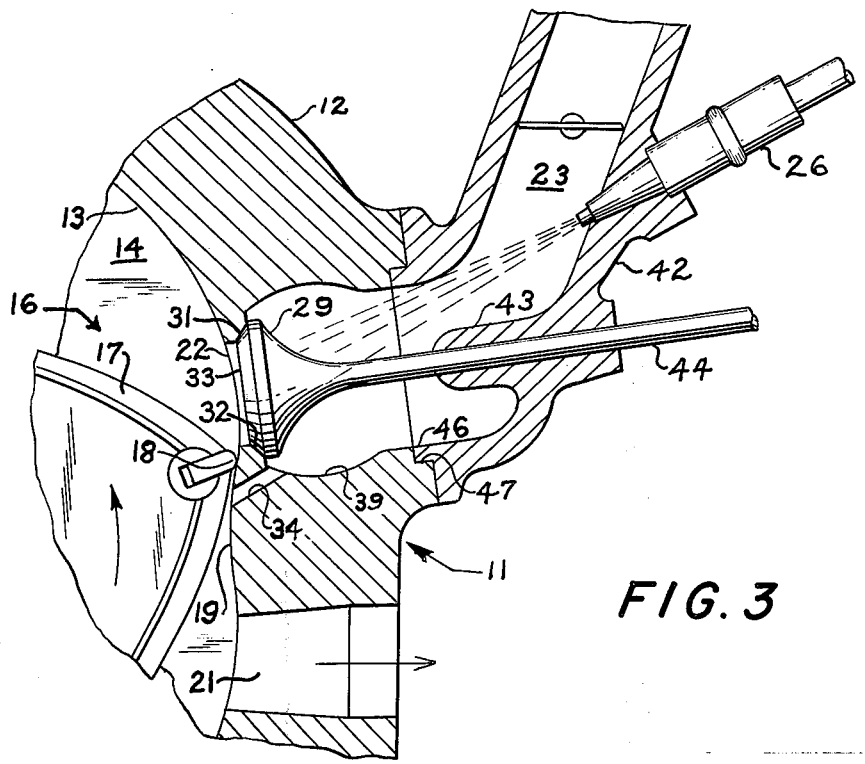
FIG. 3 is a similar cross-section showing a third embodiment of the throttling device.

In FIG. 3 there is shown another embodiment, wherein the same reference numerals are used for the same or similar features. A member 42 defining the intake channel 23 is provided with a boss 43 projecting inwardly into the intake channel and having a bore serving as the guideway for the slide member 44. The slide 44 has a closure head 29 as in previous embodiments, provided with a sealing surface 31 seating against a mating surface 32 surrounding the intake port 22. In this embodiment the intake channel member 42 is demountable from the peripheral housing and is provided with a shoulder 46 which seats in a mating centering bore 47 in the housing. Shoulder 46 is coaxial with the guideway for the slide member 44, and bore 47 is coaxial with the valve seat 32. Thus, when member 42 is mounted in position the closure head 29 of the slide automatically has its sealing surface 31 aligned in proper orientation for seating.

In all the embodiments described, depending on the requirements of the engine, the sealing surfaces 31 and 32 may be made relatively broad so that the fuel path through the throttling gap is long for suitable preparation of the fuel-air mixture, or either sealing surface may be formed so as to provide only a lineal abutment of the closure head against the seat.

Figure 4:
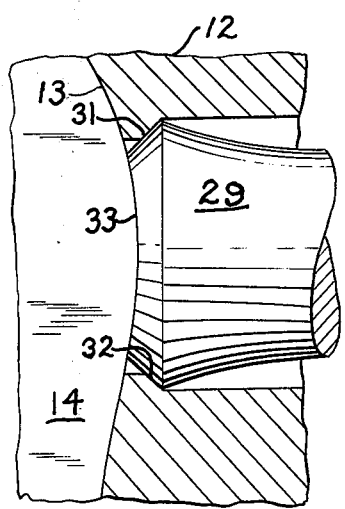
FIG. 4 is a fragmentary cross-section on an enlarged scale, showing a modification adaptable to any of the valve members of the invention.

FIG. 4 shows an enlarged view of a closure head 29 as it may be used on any of the slide members 28, 37, or 44. The end face 33 of head 29 may be formed to have a curvature congruent with that of the inner trochoidal surface 13 so that in the closed condition the end face is flush therewith, and no cavity at all remains at the intake port. This completely avoids the entry of any exhaust gas, and incoming fresh mixture undergoes no dilution even when the engine is operating at its lowest level of intake through the port. When the end face 33 is provided with a curved configuration in this manner, the slide is provided with a key and keyway or other suitable means to prevent it from turning.

Although in the drawings the intake port 22 is shown as a circular aperture, with the closure head 29 having a similar circular shape, in some cases it may be desirable to have the intake port of some other shape. The closure head is then formed with a congruent outline, and again the slide member is provided with means to prevent it from turning.

By-pass channel 34 has its orifice upstream from the orifice of intake port 22. When the engine is idling by means of intake through the by-pass 34 only, advantageous timing results, in that the sealing portion of the rotor apex sweeping the peripheral surface 13 cannot obstruct the orifice of the by-pass channel for any significant period of time. The use of the by-pass for idling also avoids the deposit of any particles of liquid fuel above the throttling gap between sealing surfaces 31 and 32, which would be carried along when that gap is opened and might occasionally result in an over-rich mixture.

In case the by-pass channel is dispensed with and no independent idling system is used, the idling mixture can be supplied to the operating chamber with great turbulence produced by the very narrow throttling gap between the two sealing surfaces 31 and 32.

What is claimed is:

1. A rotary internal combustion engine having a housing comprising a peripheral shell with a multilobed inner surface of substantially trochoidal profile and a pair of side walls defining therein an engine cavity, a generally polygonal rotor having a plurality of apex portions rotatably mounted within the engine cavity and defining with the housing a plurality of operating chambers of variable volume, the rotor apex portions sweeping the inner trochoidal surface in sealing relation thereto, the housing having an exhaust port in the region of a cusp of the trochoid and disposed upstream therefrom in the direction of rotor rotation and an intake port in the peripheral shell in the region of the cusp and disposed downstream therefrom, intake passage means in communication with the intake port and serving to provide fuel-air mixture thereto, wherein the improvement comprises:

a. throttling means comprising an elongated valve member extending into said intake passage means and having its longitudinal axis disposed substantially perpendicular to the inner trochoidal surface at the intake port and being slidable along its axis, said intake passage means having a generally annular chamber close to the intake port and outward therefrom surrounding the inner end of the valve member, said annular chamber being in communication with the engine operating chamber through the intake port when the valve member is in its open position;

b. the valve member having a slide portion and at its inner end a closure head portion integral with said slide portion and having an annular sealing surface thereon;

c. the intake port having therein an annular sealing valve seat formed in the intake port for cooperation with the sealing surface of said valve member head portion and with said valve seat being disposed close to the inner trochoidal surface and being coaxial with said valve member; and d. said valve member being axially slidable to move its integral head portion axially toward and away from said valve seat so that the intake port is closed when said head portion is in its innermost position against said valve seat and so that a symmetrical annular intake port opening is provided between said head portion and valve seat when the valve member head portion is positioned away from said valve seat.

2. The combination recited in claim 1 wherein idling channel means by-passes the valve seat and communicates between the intake channel and the engine cavity, the discharge end of said idling channel means being disposed in the inner trochoidal surface upstream of the intake port relative to the direction of rotor rotation.

3. The combination recited in claim 1, wherein the elongated valve member is generally cylindrical and hollow with its outermost end open to the intake channel and its inward end having lateral apertures through the cylinder wall to provide a communicating path from the interior of the cylindrical member to the annular chamber.

4. The combination recited in claim 1, wherein the closure head portion of the valve member has a plane face on its inner end facing the operating chamber, and in the closed position the center of the plane inner face is approximately tangent to the curvature of the inner trochoidal surface.

5. The combination recited in claim 1, wherein the closure head portion of the valve member has on its inner end a concavely curved face which is substantially flush with the inner trochoidal surface in the closed position.

* * * * *